United States Patent [19]

Miura et al.

[11] Patent Number: 5,248,584
[45] Date of Patent: Sep. 28, 1993

[54] OPTICAL CARD AND METHOD FOR READING INFORMATION RECORDED IN IT

[75] Inventors: Kyo Miura, Yokohama; Hisaaki Kawade, Atsugi; Keiko Ikoma, Yokohama; Yoshihiro Oguchi, Kawasaki; Masashi Miyagawa, Yokohama; Mizuho Hiraoka, Kawasaki; Hitoshi Yoshino, Tokyo; Kazumi Nagano, Fujisawa, all of Japan

[73] Assignee: Canon Kabushiki Kaisha, Tokyo, Japan

[21] Appl. No.: 581,188

[22] Filed: Sep. 11, 1990

Related U.S. Application Data

[63] Continuation of Ser. No. 91,104, Aug. 31, 1987, abandoned.

[30] Foreign Application Priority Data

Sep. 3, 1986 [JP] Japan .................. 61-205870
Nov. 4, 1986 [JP] Japan .................. 61-260800
Jul. 13, 1987 [JP] Japan .................. 62-172917
Jul. 13, 1987 [JP] Japan .................. 62-172918

[51] Int. Cl.⁵ ...................... G03C 1/72; G11B 7/24
[52] U.S. Cl. ................... 430/270; 430/273; 430/495; 430/945; 369/100; 369/109; 369/275.1; 369/275.3; 369/284; 346/76 L; 346/135.1

[58] Field of Search ............. 430/270, 495, 273, 11, 430/13, 945; 235/487, 488; 346/76 L, 135.1; 369/100, 109, 273, 275.1, 275.3, 286, 284; 283/85

[56] References Cited

U.S. PATENT DOCUMENTS

| | | | |
|---|---|---|---|
| 4,500,777 | 2/1985 | Drexler | 235/487 |
| 4,656,121 | 4/1987 | Sato et al. | 430/495 |
| 4,673,626 | 6/1987 | Takeda et al. | 430/14 |
| 4,680,456 | 7/1987 | Drexler | 235/454 |
| 4,766,054 | 8/1988 | Hirose et al. | 430/270 |

FOREIGN PATENT DOCUMENTS

0083991 7/1983 European Pat. Off. .

OTHER PUBLICATIONS

Pat. Abs. Japan, vol. 10, No. 338 (1986) 139952.
Pat. Abs. Japan, vol. 11, No. 142 (1987) 278055.

*Primary Examiner*—Lee C. Wright
*Attorney, Agent, or Firm*—Fitzpatrick, Cella, Harper & Scinto

[57] ABSTRACT

An optical card comprises a transparent substrate having a track groove on its surface, an optical recording layer provided on said track groove, and an opaque card substrate provided in such a manner that it may be contiguous to said optical recording layer, wherein an unrecordable part is provided at an end of said track groove formed on the surface of the transparent substrate.

25 Claims, 3 Drawing Sheets

OPTICAL CARD AND METHOD FOR READING INFORMATION RECORDED IN IT

This application is a continuation of application Ser. No. 07/091,104, filed Aug. 31, 1987, now abandoned.

BACKGROUND OF THE INVENTION

1. Field of the Invention

The present invention relates to an optical card, and, particularly, to a cardlike information recording carrier for optically recording and reproducing information.

2. Related Background Art

Recent years, as the society becomes progressively informationized, various information recording carriers and apparatus for optically recording and reproducing information, including an optical disc, an optical card, an optical tape, etc., have been proposed as a means for dealing with a great variety of information with high efficiency. Such information recording carriers include those which can detect the binary-coded information by a change of reflectivity a change of strength of reflected light which accompanies with a change of surface shape corresponding to the presence or absence of pits(holes), or a change of polarized light surface by magnetooptic effect. These information recording carriers are characterized by having advantages such that they can achieve high recording density and can perform non-contact recording and reproducing, and therefore can enjoy a long life.

Studies and development have been also extensively made in recent years in respect of cardlike information recording carriers (hereinafter referred to as optical cards) having good portability and having a large capacity considering their size.

The information recording carriers for optically recording and reproducing information will be described below by making reference to the optical cards.

Referring to how to optically record and reproduce information, there is performed, for example, the magneto-optical recording in which the magnetizing direction is reversed by an energy beam, the recording performed by forming concavo-convex pits, or the recording by utilizing the difference in optical reflectance. Usually, however, widely used are recording carriers utilizing the difference in the optical reflectivity as they have a high S/N ratio and can be easily produced.

As the recording carriers utilizing the difference in optical reflectivity, there have been proposed, for example, cards having a recording layer comprising silver particles dispersed in a gelatin matrix. The writing of information in this recording layer is carried out by irradiating a laser beam on the recording layer to form recording pits.

On the other hand, there have been proposed the so-called heat mode recording elements, in which recording is carried out by irradiating an energy beam such as a laser beam on a recording layer in the form of a spot and changing in part the state of the recording layer. As these recording layers, used are metallic thin films comprising tellurium, bismuth, etc., organic thin films comprising polystyrene, nitrocellulose, etc., dye thin films comprising cyanines, or tellurium low oxidized product films utilizing phase transition. These recording elements do not require any development processing or the like after writing of information, and are called DRAW (direct read after write) media that can "read immediately after writing", by which high density recording can be performed and additional writing can be also performed.

Figure 3:
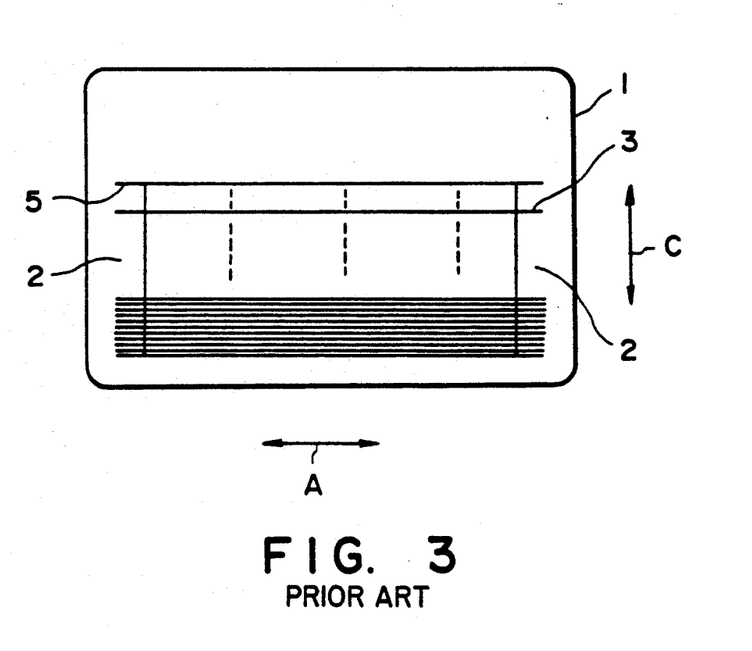
FIG. 3 is a schematic plan view showing a recording format of an optical card in the prior art.

FIG. 3 is a plan view showing a recording format of a conventional DRAW type optical card.

In FIG. 3, an optical card 1 which is the recording carrier is provided on it with a recording area 2, and the recording area 2 is formed by a track 3 arranged in plurality. In the track 3, further formed are a start bit and a stop bit, and the track 3 has information capacity of about several thousand bits. Each of the track 3 is also partitioned by a reference line 5 (hereinafter "R-line"). Arrow A indicates the direction in which the optical card 1 moves at the time of reproducing.

Figure 4:
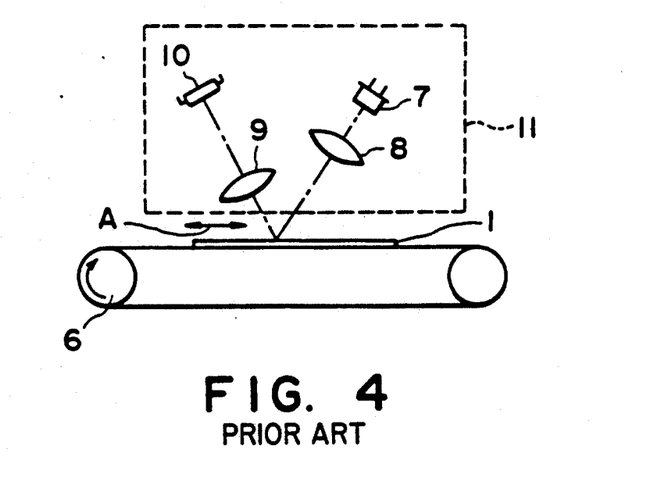
FIG. 4 is a schematic constitutional view showing an optical card reproducing process in the prior art.

FIG. 4 is a schematical view of an optical card reproducing process.

In FIG. 4, the optical card 1 is movable in the direction of arrow A by means of a rotating mechanism 6. The information recorded on the optical card 1 is read by an optical head 11 for each track 3 and reproduced. First, light from a light source 7 such as a semiconductor laser is condensed by a lens system 8, and irradiates the track 3 on which the information has been recorded. An image of the track 3 irradiated is formed on a sensor 10 through means of an image formation optical system 9, and an electrical signal corresponding to the information recorded on the above track 3 is output from the sensor 10.

Once the read-out on the above track 3 is completed, the optical card moves in the direction of arrow A or the optical head 11 moves in the direction in which the tracks 3 are arranged (the direction of arrow C), so that the information on the subsequent track 3 is read in the similar manner.

To gain access to an arbitrary track 3 on the optical card 1, the optical head 11 is moved in the direction of arrow C. The optical head 11 counts the R-line 5 to select a track 3 to which a target track 3 intended to be read belongs, and stops when reaches the target track 3. Subsequently, the optical card 1 is moved in the direction of arrow A by means of the rotating mechanism 6 to perform read-out of information on the target track 3.

In this manner, in the conventional information recording carrier such as the optical card 1, information can be optically read or reproduced by utilizing the light irradiated from the light source 7 provided on the optical head of the optical recording and reproducing apparatus.

As described above, in carrying out the reproducing on the optical card, the optical card 1, while tracking is performed, moves in the direction of arrow A by means of the rotating mechanism 6 to perform the read-out of information, but occasionally the optical card stops because the optical card may reversingly move along with its move in the direction A, during which the writing may proceed, though very slowly, owing to the energy of read-out light, until it turns difficult to detect the tracking signal. In other words, the energy of the read-out light repeatedly irradiates a portion of the optical card when movement is stopped, and this irradiation may alter the optical characteristics of that portion of the card.

SUMMARY OF THE INVENTION

The present invention has been made in order to solve the above problem. Accordingly, an object of the present invention is to provide an optical card that can prevent the undesirable writing which may occur owing to read-out light when the optical card is reversed to stop as it moves.

Another object of the present invention is to provide an optical card that may cause no tracking error in carrying out read-out repeatedly.

According to one aspect of the present invention, there is provided an optical card comprising a transparent substrate having a track groove on its surface, an optical recording layer provided on said track groove, and an opaque card substrate provided in such a manner that it may be contiguous to said optical recording layer, wherein an unrecordable part (herein meant to be "a part incapable of being recorded") is provided at an end of said track groove formed on the surface of the transparent substrate.

According to another aspect of the present invention, there is provided a method for reading and reproducing information recorded in an optical card comprising a transparent substrate having a track groove on its surface, an optical recording layer provided on said track groove, and an opaque card substrate provided in such a manner that it may be contiguous to said optical recording layer, by irradiating a read-out light from the side of the transparent substrate, wherein a position on which movement of the read-out light is stopped is an unrecordable part provided at the end portion of a track groove formed on the surface of the transparent substrate.

DETAILED DESCRIPTION OF THE PREFERRED EMBODIMENTS

The present invention will be described below in detail.

The optical card according to the present invention comprises an optical card provided on a card substrate with an optical recording element. The optical recording element comprises (a) a transparent substrate having a track groove and (b) an optical recording layer provided on said track groove. This optical recording element, which constitutes a DRAW type card comprising an optical recording layer provided on an opaque card substrate in such a manner that it may be contiguous thereto, is characterized by an unrecordable part provided at an end portion of the track groove formed on the surface of the transparent substrate.

Figure 1:
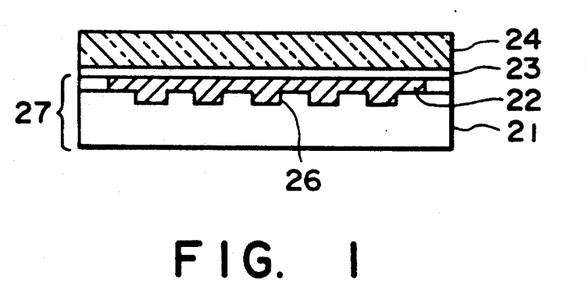
FIG. 1 is a schematic cross-sectional view showing an embodiment of the optical card according to the present invention.

The optical card according to the present invention will be described below on the basis of a specific example shown in the drawing. FIG. 1 is a cross-sectional view showing an embodiment of the optical card according to the present invention.

In FIG. 1, the optical card according to the present invention comprises i) an optical recording element 27 comprising a transparent substrate 21 having track grooves 26 thereon, and an optical recording layer 22 provided on the track grooves, and further comprising marginal portions 25 (FIG. 2) corresponding to the unrecordable part provided at both ends (not shown in FIG. 1) of the track grooves, and ii) an opaque card substrate 24 provided in such a manner that it may be contiguous to the optical recording element 27 with interposition of an adhesive layer 23.

If necessary, the optical card may be together provided on its top surface or back surface with a magnetic recording layer, an IC memory, an engraved image, a photograph, a character, a mark, an embossed character called an imprint. Such measures taken can make it possible to deal with various reproducing systems in one card, and also can more effectively prevent forgery.

The transparent substrate 21 having the track grooves 26 may preferably include those causing less difficulties in the optical recording and reproducing, and also preferably include those having thermoplastic properties as having good formability to form the track grooves. For example, there can be used acrylic resins, polyester resins, polycarbonate resins, vinyl resins, polyimide resins, polyacetal resins, polyolefin resins, polyamide resins, cellulose derivatives, etc.

In the present invention, in the case the substrate comprises a thermoplastic resin, the track grooves can be formed on the substrate by using a process in which a stamper pattern is heat-transferred according to injection molding or heat press molding at a temperature higher than the melting point of the resin, or a process in which a stamper pattern is photo-transferred according to a method comprising coating a photo-setting resin composition on the substrate, on which a stamper pattern is adhered, followed by irradiation with ultraviolet rays or the like to allow said photo-setting resin composition to cure.

In the case of the heat transfer process, the track grooves and the transparent substrate are formed into an integral body. In contrast thereto, in the case of the photo-transfer process, the track grooves are formed not integrally with, but in adhesion to, the transparent substrate.

Alternatively, apart from the stamper type transfer process, the track grooves can be formed on the substrate by forming a resist film on a transparent substrate having a light-transmissive this film with desired thickness capable of being etched, exposing it to light through a photomask having the pattern corresponding to the track grooves, followed by developing to form a resist pattern, and etching the above light-transmissive thin film with use of the resist pattern as a mask.

As the opaque card substrate 24, any kind of materials usable as ordinary card materials can be used. Specifically, there can be used polyvinyl chloride, a vinyl chloride/vinyl acetate copolymer, polyvinylidene chloride, an acrylic type polymer such as polymethyl methacrylate, polystyrene, polyvinyl butyral, acetyl cellulose, a styrene/butadiene copolymer, polyetylene, polypropylene, polycarbonate, etc. In some instances, there can be also used metallic sheets made of iron, stainless steel, aluminum, tin, copper, zinc, etc., synthetic paper, paper and so forth. Besides, a laminate of the materials as above can be also used. Such an opaque card substrate 24 may be optionally subjected to pretreatment for improving the adhesion, such as corona discharge treatment, plasma treatment and primer treatment.

In the case the wavelength of an energy beam for reproducing is 650 nm or more, particularly 700 to 900 nm, the optical recording layer 22 may preferably have a great difference between the reflectivity in the pit which is the recorded part and that in the non-recorded part. Also, the smaller energies necessary for producing a change of the reflectivity by irradiation of an energy beam for recording are the more preferable. Still also, preferred are those in which the reflectivity in the recorded part (pits or the like) and non-recorded part may not be changed by the energy beam for reproducing (i.e., the read-out light moving across a card). For example, oxides of Te, Sb, Mo, Ge, V, Sn or the like and compounds such as Te-Sn, TeOx-Ge may cause phase transition by irradiation of the energy beam to change the reflectivity. In other words, the recording layer is susceptible to a change of reflectivity when irradiated. It is also possible to use composite materials of metals such as Te-CH$_4$, Te-CS$_2$, Te-styrene, Sn-SO$_2$, GeS-Sn, SnS-S with Te-CH$_4$, Te-CS$_2$, Te-styrene, Sn-SO$_2$, GeS-Sn, SnS-S with organic compounds or inorganic sulfides; or multi-layer films such as a SiO$_2$/Ti/SiO$_2$/Al film. It is further possible to use those obtained by dispersing particles of metals such as silver in a thermoplastic resin such as nitrocellulose, polystyrene and polyethylene; or those obtained by aggregating metallic particles on the surface of this thermoplastic resin. There can be also used chalcogen or color developing type MoO$_3$-Cu, MoO$_3$-Sn-Cu, etc., and, in some instances, can be also used a multi-layer product of a foam formation-type organic thin film with a metallic thin film.

An organic thin film whose properties are capable of being optically changed by an energy beam can be also used, comprising, for example, dyes such as anthraquinone derivatives, particularly those having an indanthrene skeleton, dioxazine compounds and derivatives thereof, triphenodithiazine compounds, phenanthrene derivatives, cyanine compounds, merocyanine compounds, pyrylium compounds, xanthene compounds, thriphenylmethane compounds, croconium dyes and crocones. These enables continuous production according to solution coating, and therefore are preferable for the present invention.

The unrecordable part in the present invention should have substantially the same reflectivity as with that of the optical recording layer i.e., within a tolerance reflectance of about ±25% is tolerable), and is a part at which any optical change (in refractive index, reflectivity absorption, etc.) or physical change (e.g. deformation by heat) may not substantially be caused by the energy of the read-out light when the recorded information is reproduced.

In the following, a process for producing the optical card according to the present invention will be described.

First, the track grooves 26 are formed by hot pressing or the like on the transparent substrate 21 made of polymethyl methacrylate resin or polycarbonate resin. Subsequently, an unrecordable part that has substantially the same reflectivity with that of the optical recording layer and also may not undergo any change at all by the energy of read-out light is formed at the marginal portions 25 shown in FIG. 2. Thereafter, the optical recording layer is formed on the part of the track grooves 28 or the track grooves 28 including the marginal portions 25. If the optical recording layer 22 is formed by coating a solution obtained by dissolving, for example, a cyanine as an organic dye in a solvent, followed by drying, the unrecordable part can be formed by previously coating on the marginal portions 25 a solution obtained by dissolving in a solvent a phthalocyanine having substantially the same reflectivity, for example, iron phthalocyanine, nickel phthalocyanine, copper phthalocyanine, a sodium salt of dicyanocobalt phthalocyanine, cobalt phthalocyanine, etc. or a mixture obtained by dispersing a small amount of resin in a solvent followed by kneading.

For the unrecordable part, there can be also used a thin film containing a diimonium salt or aminium salt. Used as the diimonium salt or aminium salt are the compound represented by General Foumula (I) shown below.

General Foumula (I):

In the formula, R represents a lower alkyl group; $X^\ominus$ represents an acid anion; m represents an integer of 0, 1 or 2; and A represents (n is 1 or 2) or when the above m is 2.

Specific examples thereof may include the following compounds I and II:

| | R | $X^\ominus$ | m | A |
|---|---|---|---|---|
| Compound I | nBu | $ClO_4^\ominus$ | 2 |  |
| Compound II | nBu | $ClO_4^\ominus$ | 1 |  |

The thin film containing these diimonium salts or aminium salts have a high value to reflectivity of 10 to 12%. Thus, since the reflectivity of the unrecordable part containing the diimonium salt or aminium salt is as high as 10 to 12%, this can be used in all of recording media (reflectivity : 8 to 16%) generally used, and can have high stability against the decrease in reflectivity due to the undesirable writing which may occur owing to read-out light when the optical card is reversed to stop as it reversingly moves.

The unrecordable part may be also formed by using a film coated with an unrecordable material (herein also meant to be a material incapable of being recorded). The unrecordable material may include, for example, dithiolato complexes of metals, diimonium salts, ammonium salts, etc. It may desirably be coated in thickness of 500 to 3,000 Å, preferably 800 to 1,500 Å.

The film to be coated with the unrecordable material may be 10 to 500 μm in thickness, and there can be used, for example, polyethylene terephthalate, polyimide, polycarbonate, polymethyl methacrylate, etc.

The film coated with the unrecordable material can be advantageously used when a recording material coating solution for forming the optical recording layer and an unrecordable material coating solution for forming the unrecordable part are readily soluble in each other.

If the coating solutions readily soluble in each other is used in an instance where an optical card is produced by coating on the transparent substrate the material incapable of being optically recorded, and, after drying, coating thereon the recording material to provide the optical recording layer, there is a possibility that the unrecordable material is dissolved in the solvent when the recording material is coated, even though the coating of the recording material is carried out after drying of the unrecordable material. For this reason, the unrecordable material may be intermingled with the recording material and exuded to the recording part, and damage of an unrecordable material layer may occur in the unrecordable part. Accordingly, the unrecordable part comprising the film coated with the unrecordable material may be formed by adhering the above film on the transparent support, whereby it may not occur that the recording material and the above unrecordable material are intermingled with each other. Thus, there can be prevented a lowering or unevenness of the reflectivity of the unrecordable part, that may occur owing to intermingling of the above materials, and the undesirable writing which may occur owing to read-out light when an optical card is reversed to stop as it moves at the time of tracking. Also, there can be no exudation of the unrecordable material to the recording part, and it is made possible to perform better and stable writing, reproducing tracking, and autofocusing.

As coating methods, there can be used dip coating, spray coating, spinner coating, bar coating, blade coating, roll coating, curtain coating and so forth.

Figure 2:
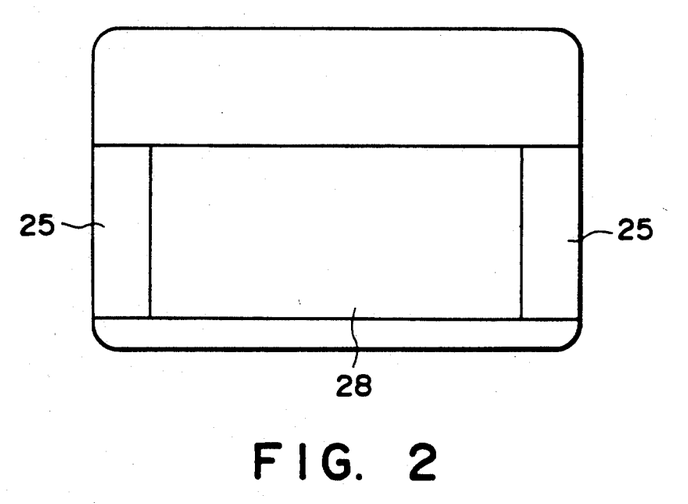
FIG. 2 is an explanatory view showing the unrecordable part provided on an optical recording layer.

The marginal portions 25 and the optical recording layer 22 each may be about 500 to 2,000 Å, preferably about 1,000 Å, in film thickness. In particular, from a viewpoint of the recording sensitivity, they may preferably be of smaller thickness, and, from a view point of the S/N ratio in reproducing, of somewhat greater thickness. Optimum film thickness may vary depending on the type of dyes.

The optical recording element wherein part of the above optical recording layer has been made incapable of being recorded, may be overlapped in such a manner that the optical recording layer 22 may be contiguous to the opaque card substrate 24, between which the adhesive layer 23 which is thermally adhesive is interposed, followed by contact bonding with use of a heat-fixing roll heated to about 90° to 150° C. An optical card can thus be produced.

In the production of this optical card, the heat contact bonding may preferably be carried out by overlapping the opaque card substrate on the transparent substrate having the track grooves on its surface, with interposition of a thermoplastic adhesive sheet having been beforehand provided on one side thereof with the optical recording layer, and in such a manner that the optical recording layer may be in contact with the track groove faces, whereby an optical card having good recording and reproducing performances can be produced.

Figure 5:
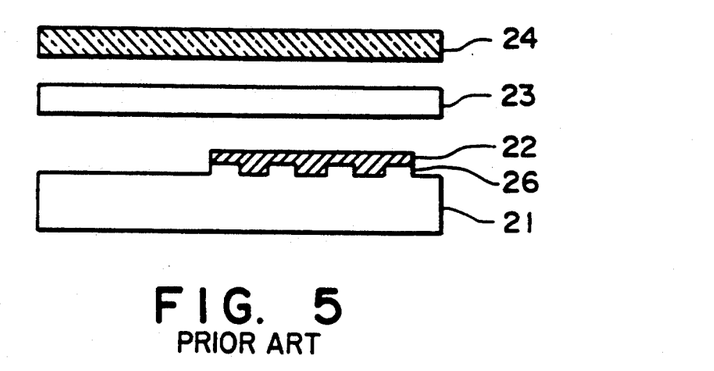
FIG. 5 is a schematic constitutional view of a laminating step in the conventional process for producing an optical card.

As shown in FIG. 5, in a laminating step in the conventional process for producing an optical card, the optical card has been produced by forming the optical recording layer 22 on the transparent substrate 21 having the track grooves 26, followed by heat contact bonding of the opaque card substrate with interposition of the adhesive layer 23.

In the above-mentioned conventional process for producing an optical card, the optical recording layer 22 is formed on the transparent substrate 21 having the track grooves 26. However, it has been difficult to control the film thickness of the optical recording layer 22, since there is irregularity of the groove in the track groove portion in order to perform tracking in accordance with the phase difference of a laser beam. It has been made clear that the sensitivity of the optical recording layer 22 strongly depends on the film thickness, and, in particular, the film thickness is considered important.

In the instance where the organic recording material such as dyes are used for the optical recording layer 22, a solvent solution of the dye is coated and dried to form the optical recording layer 22. Therefore, in view of the problem of solvent resistance in respect of the transparent substrate 21 and the track grooves 26, limitation may sometimes be set on the type of the solvent or the concentration of the solution used for forming the optical recording layer 22.

Moreover, as the solvent solution of the dye is coated and dried to form the optical recording layer 22, the solvent, depending on its type, may remain even after the drying to cause poor adhesion between the adhesive layer 23 and the optical recording layer 22 in the laminating step, bringing about a problem such that the recording and reproducing performances of the optical recording layer are worsened.

Now, an optical card having solved the above problems and having good recording and reproducing performances can be produced by a process for producing an optical card comprising a transparent substrate having a track groove on its surface, an optical recording layer provided on said track groove, and an opaque card substrate provided in such a manner that it may be contiguous to said optical recording layer, wherein;

(1) a transparent substrate having a track groove, a thermoplastic adhesive sheet provided on one side thereof with an optical recording layer, and an opaque card substrate are overlapped in such a manner that the optical recording layer may be in contact with the track groove, followed by heat contact bonding; or (2) a transparent substrate having a track groove, and an opaque card substrate fitted with a thermoplastic adhesive sheet provided on one side thereof with an optical recording layer are overlapped in such a manner that the optical recording layer may be in contact with the track groove, followed by heat contact bonding.

Figure 6:
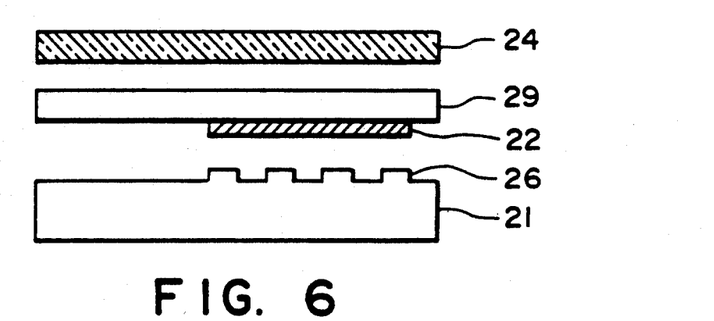
FIG. 6 is a schematic constitutional view showing an example of a laminating step in a preferred process for producing an optical card.

FIG. 6 is a schematic constitutional view of the process for producing an optical card according to the above step (1). The optical card is produced through a laminating step in which a transparent substrate 21 having track grooves 26, a thermoplastic adhesive sheet 29 provided on one side thereof with an optical recording layer 22, and an opaque card substrate 24 are overlapped in such a manner that the optical recording layer 22 may be in contact with the track grooves 26, followed by heat contact bonding.

Figure 7:
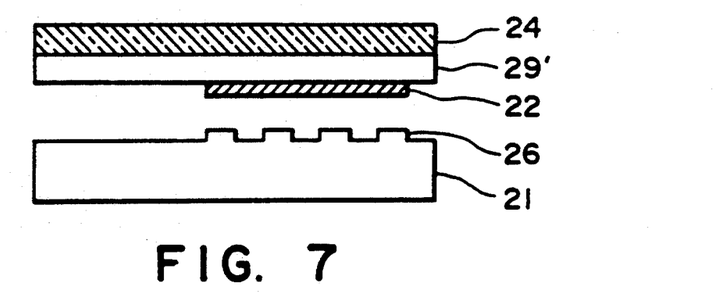
FIG. 7 is a schematic view showing another example for the laminating step.

FIG. 7 is a schematical constitutional view showing the process for producing an optical card according to the above step (2). The optical card is produced through a laminating step in which a transparent substrate 21 having track grooves 26, and an opaque card substrate 24 fitted with a thermoplastic adhesive sheet 29' provided on one side thereof with an optical recording layer 22 are overlapped in such a manner that the optical recording layer 22 may be in contact with the track grooves 26, followed by heat contact bonding.

In the process for forming the optical recording layer, when, for example, the aforesaid solvent solution of the dye is coated, the solvent solution has so low viscosity that the solution may tend to stay in the track grooves by coating it on the track grooves in the conventional manner, making it difficult to carry out uniform film formation. However, as shown in FIG. 6 or FIG. 7, the solvent solution of the dye may be coated on the thermoplastic adhesive sheet 29 or the opaque card substrate 24 fitted with the thermoplastic adhesive sheet 29', whereby it becomes possible to carry out uniform film formation giving constant film thickness.

In this instance, polymethyl methacrylate resins or polycarbonate resins have been widely used conventionally for the transparent substrate having the track grooves formed by the heat transfer process, so that there could not be used the solvent liable to affect the substrate when the solvent solution of the dye is coated on its surface, and it has been also difficult to increase the solubility of the dye. However, as a result that the solvent solution is coated on the thermoplastic adhesive sheet, the solvent can be selected in a wider range.

The thermoplastic adhesive sheet 29 may include those made of, for example, an ethylene/vinyl acetate copolymer and modified resins thereof, an ethylene/ethyl methacrylate copolymer, a vinyl acetate/acrylate copolemer, etc.

The opaque card substrate 24 fitted with the thermoplastic adhesive sheet 29' may be used by previously laminating the thermoplastic adhesive sheet 29 on the opaque card substrate. In this instance, the thermoplastic adhesive sheet 29' and the opaque card substrate 24 can be laminated according to a process in which the thermoplastic adhesive sheet is heat sealed under heating, a process in which the lamination is effected through means of an additional adhesive, or the like process. Accordingly, the thermoplastic adhesive sheet 29' may in certain cases have double-layer structure, but can be used without any difficulties.

The thermoplastic adhesive sheet 29 or 29' may preferably be about 20 to 100 $\mu$m in thickness.

Subsequently, the above thermoplastic adhesive sheet and the opaque card substrate, or the opaque card substrate fitted with the thermoplastic adhesive sheet, and the transparent substrate may be subjected to contact bonding with use of a heat-fixing roll heated to about 90° C. to 150 ° C. while retaining the above-mentioned layer structure, according to the laminating step as shown in FIG. 6 or FIG. 7, whereby the optical card can be produced.

If necessary, in the DRAW type optical card produced in the manner as described above, it is also possible to provide on the transparent substrate 21 a hard coat for preventing the card from being scratched. In order to increase the fastness to light, it is also possible to form an ultraviolet absorption film on the transparent substrate 21. Also, in an instance where the transparent substrate itself comprises a resin containing an ultraviolet absorbent, the fastness to light and durability can be increased by only providing the hard coat, thus giving preferable constitution.

The following is to illustrate how the information is written in the optical recording layer mentioned above and how the information written in the optical card is read.

The information can be written in the recording layer by condensing and irradiating an energy beam of 300 to 1,000 nm in wavelength through a lens or the like to form recording pits. Here, the energy strength may preferably 0.1 to 100 mW; the pulse width, 5 nsec to 500 msec; and the beam size, 0.5 to 10 $\mu$m. The energy beam to be irradiated may include laser beams from a semiconductor laser, an argon laser, a helium/neon laser, a krypton laser, etc., which are preferable for detecting the track grooves.

On the other hand, the information written in the optical card according to the present invention can be read by condensing through a lens or the like an energy beam having energy low enough to cause no change of properties of the recording layer, irradiating the condensed beam from the side of the transparent substrate of the optical card, and detecting the presence or absence of the pits while relating the strength of reflected light with the phase change.

The optical card of the present invention comprises a marginal portion corresponding to the unrecordable part, provided on certain part of the optical recording layer provided on the track grooves of the transparent substrate having track grooves on its surface. Accordingly, at the marginal portion, the reflectivity may not be changed by the irradiation of energy beam of read-out light, even when the optical card has stopped, and therefore no tracking error may occur even if the optical card reversingly moves with repetition. This is in contrast to the recording layer, as discussed above, on which writing may proceed slowly due to the energy of the read-out light when movement has stopped.

Further, the relationship between the position of the optical card and that of the read-out light is relative. Therefore, needless to say, the same effects as in the above can be obtained even when movement of the read-out light is stopped.

The present invention will be described below in greater detail by Examples. However, the present invention is by no means limited by these.

EXAMPLE 1

Track grooves were formed by hot pressing on a transparent substrate comprising a polymethyl methacrylate film (produced by Nitto Jushi K.K.) of 54 mm wide, 85.6 mm long and 0.3 mm thick and containing an ultraviolet absorbent. There were given track groove pitch of 10 $\mu$m, track groove width of 3 $\mu$m and track groove depth of 0.2 $\mu$m.

Next, on both end portions (the portions corresponding to the numeral 25 in FIG. 2) on the surface of this track grooves, a substance obtained by dispersing copper phthalocyanine in PMMA resin was coated with use of a roll coater to give a width of 10 mm, and, after drying, a solution obtained by dissolving a dye of the following formula (II) in 2-butanone was spinner-coated on the track groove part 28 to form a recording layer of about 900 Å in thickness.

(II)

On the other hand, a card substrate comprising a white and hard vinyl chloride film of 0.4 mm thick was overlapped in such a manner that it may be contiguous to the optical recording layer of the above optical recording element with interposition of a thermal adhesive (a vinyl chloride/vinyl acetate/maleic acid resin), followed by lamination by contact bonding with use of a heat roll having a surface temperature of 120° C. Thereafter, the surface of the transparent substrate was treated with a silicone type surface hardening agent to produce an optical card.

The reflectivity of the optical card produced was measured from the transparent substrate side to find that it was 15% on the optical recording layer part, and 12% on the unrecordable part.

The optical card thus obtained was used without causing the undesirable writing owing to read-out light even when the optical card stopped as it reversingly moved, and there occurred no tracking error even in a 30,000 time reciprocating test.

EXAMPLE 2

Track grooves were formed by hot pressing on a transparent substrate comprising polycarbonate (Panlite AD-5503, produced by Teijin Chemical Ltd.) of 0.3 mm thick. The track grooves were made to have the shape entirely same as that in Example 1.

On the marginal portions, a solution obtained by dissolving a sodium salt of dicyanocobalt phthalocyanine in a DMF/benzene (1:1) mixed solvent containing 5% vinyl acetate was coated with use of a roll coater, and, after drying, the dye solution used in Example 1 was spinner-coated to form a recording layer of about 1,100 Å in thickness.

On the other hand, a card substrate comprising a white polycarbonate film of 0.4 mm thick was overlapped in such a manner that it may be contiguous to the optical recording layer of the above optical recording element with interposition of a thermal adhesive (Placcel H-7, produced by Daicel Chemical Industries, Ltd.), followed by lamination by contact bonding with use of a heat roll having a surface temperature of 120° C.;

The reflectivity of the optical card produced was measured from the transparent substrate side to find that it was 15% on the optical recording layer part, and 13% on the unrecordable part.

The optical card thus obtained was used without causing the undesirable writing owing to read-out light even when the optical card stopped as it reversingly moved, and there occurred no tracking error even in a 30,000 time reciprocating test.

EXAMPLE 3

Track grooves were formed by hot pressing on a transparent substrate comprising a polymethyl methacrylate film (produced by Nitto Jushi K.K.) of 54 mm wide, 85.6 mm long and 0.4 mm thick. There were given track groove pitch of 10 μm, track groove width of 3 μm and track groove depth of 0.2 μm.

Next, on both end portions (the portions corresponding to the numeral 25 in FIG. 2) on the surface of this track grooves, a solution obtained by dissolving the dye of the compound I in diacetone alcohol was coated with use of a roll coater,

Compound I:

$R = nBu, Y^\ominus = ClO_4^\ominus$ and, after drying, a solution obtained by dissolving a dye of the following formula (III) in diacetone alcohol was spinner-coated on the track groove part to form a recording layer of about 1,000 Å in thickness. The unrecordable part was about 1,000 Å in thickness.

Formula (III):

On the other hand, a card substrate comprising a white and hard vinyl chloride film of 0.4 mm thick was overlapped in such a manner that it may be contiguous to the optical recording layer of the above optical recording element with interposition of a thermal adhesive (a vinyl chloride/vinyl acetate/maleic acid resin), followed by lamination by contact bonding with use of a heat roll having a surface temperature of 100° C. to produce an optical card. The optical recording layer part had the reflectivity of 13%. The unrecordable part had the reflectivity of 11%.

The optical card thus obtained was used without causing the undesirable writing owing to read-out light even when the optical card stopped as it reversingly moved, and there occurred no tracking error even in a 100,000 time reciprocating test.

EXAMPLE 4

Track grooves were formed by hot pressing on a transparent substrate comprising polycarbonate (Panlite AD-5503, produced by Teijin Chemical Ltd.) of 0.4 mm thick. The track grooves were made to have the shape entirely same as that in Example 3.

On the unrecordable part, a solution obtained by dissolving the dye of the above compound II in diacetone alcohol was coated with use of a roll coater, and, after drying, the solution of the dye represented by formula (III) as used in Example 3 was spinner-coated to form a recording layer of 1,000 Å in thickness. The unrecordable part was about 900 Å in thickness.

On the other hand, an opaque card substrate comprising a white polycarbonate film of 0.4 mm thick was overlapped in such a manner that it may be contiguous to the optical recording layer of the above optical recording element with interposition of a thermal adhesive (Placcel H-7, produced by Daicel Chemical Industries, Ltd.), followed by lamination by contact bonding with use of a heat roll having a surface temperature of 100° C. to produce an optical card. The optical recording layer part had the reflectivity of 12%. The unrecordable part had the reflectance of 10%.

The optical card thus obtained was used without causing the undesirable writing owing to read-out light even when the optical card stopped as it reversingly moved, and there occurred no tracking error even in a 100,000 time reciprocating test.

EXAMPLE 5

Track grooves were formed by hot pressing on a transparent substrate comprising a polymethyl methacralate film (produced by Nitto Jushi K.K.) of 54 mm wide, 85.6 mm long and 0.4 mm thick. There were given track groove pitch of 10 $\mu$m, track groove width of 3 $\mu$m and track groove depth of 0.2 $\mu$m.

Next, on this track grooves, a solution obtained by dissolving the dye of the above formula (III) in diacetone alcohol was coated with used of a bar coater to form an optical recording layer of about 1,000 Å in thickness.

On the other hand, on a polyethylene terephthalate film (Mylar, produced by Du Pont Co.), the solution of the dye of the above compound I was coated to give a thickness of about 1,000 Å.

On the unrecordable part of the above transparent substrate, the film coated with the above unrecordable material was overlapped in such a manner that it may be in contact with the optical recording layer, on which an opaque card substrate was overlapped with interposition of a thermal adhesive (a vinyl chloride/vinyl acetate/maleic acid resin), followed by lamination by contact bonding with use of a heat roll having a surface temperature of 100° C. As the opaque card substrate, used was a white and hard vinyl chloride film of 0.3 mm thick. Thereafter, the surface of the transparent substrate was treated with a silicone type surface hardening agent to produce an optical card. The reflectivity of the optical recording layer part and unrecordable part had 14% and 12%, respectively.

The optical card thus obtained was used without causing the undesirable writing owing to read-out light even when the optical card stopped as it reversingly moved, and there occurred no tracking error even in a 100,000 time reciprocating test.

EXAMPLE 6

Track grooves were formed by hot pressing on a transparent substrate comprising polycarbonate (Panlite AD-5503, produced by Teijin Chemical Ltd.) of 0.4 mm thick. The track grooves were made to have the shape entirely same as that in example 5.

Next, on this track grooves, a solution obtained by dissolving the dye of the above formula (III) in 2-butanone was spinner-coated to give a thickness of about 900 Å.

On the other hand, the dye of the above compound I was coated on a polyethylene terephthalate film (Lumilar, produced by Toray INductries, Inc.) with use of a bar coater.

On the unrecordable part of the above transparent substrate, the above film was overlapped in such a manner that it may be in contact with the optical recording layer, on which an opaque card substrate was overlapped with interposition of a thermal adhesive (Placcel H-7, produced by Daicel Chemical Industries, Ltd.), followed by lamination by contact bonding with use of a heat roll having a surface temperature of 120° C.

As the opaque card substrate, used was a white polycarbonate film of 0.4 mm thick.

The reflectivity of the optical recording layer part and unrecordable part had 14% and 12%, respectively.

The optical card thus obtained was used without causing the undesirable writing owing to read-out light even when the optical card stopped as it reversingly moved, and there occurred no tracking error even in a 100,000 time reciprocating test.

EXAMPLE 7

A transparent substrate comprising a polymethyl methacrylate film (Clarex produced by Nitto Jushi K.K.) of 0.4 mm thick was subjected to injection molding to form track grooves of 12 $\mu$m in pitch, 0.2 $\mu$m in depth and 3 $\mu$m in groove width.

On both end portions of the grooves on this transparent substrate provided with the track grooves, a substance obtained by dispersing copper phthalocyanine in PMMA resin was coated by use of a roll coater to give a width of 10 mm each as the unrecordable part (corresponding to the marginal portion in FIG. 2), followed by drying.

On the other hand, on an opaque card substrate comprising a white and hard vinyl chloride film of 0.3 mm thick, on which a thermoplastic adhesive sheet (Placcel H-7, produced by Daicel Chemical Industries, Ltd.) was formed with a thickness of 100 $\mu$m, a solution obtained by dissolving the dye of the above formula (II) in a mixed solvent of acetone/diacetone alcohol/isopropanol in concentration of 5% by weight was spinner-coated to form an optical recording layer of about 900 Å in thickness.

Subsequently, the above transparent substrate having the track grooves and the opaque card substrate fitted with the thermoplastic adhesive sheet having the optical recording layer were overlapped in such a manner that the optical recording layer may be in contact with the track grooves, followed by lamination by contact bonding with use of a heat roll having a surface temperature of 120° C. to produce an optical card.

The reflectivity of the optical card produced was measured from the transparent substrate side to find that it as 15% on the optical recording layer part, and 12% on the unrecordable part.

The optical card thus obtained was used without causing the endesirable writing owing to read-out light even when the optical card stopped as it reversingly moved, and there occurred no tracking error even in a 30,000 time reciprocating test.

EXAMPLE 8

A transparent substrate comprising polycarbonate (Panlite AD-5503, produced by Teijin Chemical Ltd.) of 0.4 mm thick was processed by hot pressing to form track grooves of 12 μm in pitch, 0.2 μm in depth and 3 μm in groove width.

Subsequently, on both end portions of the grooves on this transparent substrate provided with the track grooves, a 3% diacetone alcohol coating solution containing the dye of the above compound I was coated to give a width of 10 mm each as the unrecordable part, to form the unrecordable part of about 1,000 Å in thickness.

On the other hand, on a thermoplastic adhesive sheet (evaflex 7500-EXP80, produced by Mitsui Du Pont Polychemical Co.) of 50 μm thick, a solution of the dye of formula (II) was coated by use of a bar coater to form an optical recording layer with film formation to give a thickness of about 1,000 Å.

Next, white polycarbonate (Toughlon, produced by Idemitsu Petrochemical Co., Ltd) of 0.4 mm used as an opaque card substrate was overlapped in such a manner that the above optical recording layer may be in contact with the track grooves, followed by contact bonding in the form of three layer lamination with use of a heat roll having a surface temperature of 120° C. to produce an optical card.

The reflectivity of the optical card produced was measured from the transparent substrate side to find that it was 17% on the optical recording layer part, and 14% on the unrecordable part.

The optical card thus obtained was used without causing the undesirable writing owing to read-out light even when the optical card stopped as it reversingly moved, and there occurred no tracking error even in a 30,000 time reciprocating test.

COMPARATIVE EXAMPLES 1 AND 2

Examples 1 and 3 were repeated to produce optical cards, except that in Examples 1 and 3 the optical recording layers were used as such without providing the unrecordable part on the ends of the track grooves at the marginal portions. These are respectively designated as Comparative examples 1 and 2.

The optical cards thus obtained were never used without causing the undesirable writing owing to read-out light when the optical card stopped as it reversingly moved, and there occurred tracking errors in both cards when the read-out was repeated about 10 times.

What is claimed is:

1. An optical card comprising:
   (a) a transparent substrate having a field of parallel track grooves on its surface;
   (b) a marginal zone on the surface of said transparent substrate, said marginal zone containing end portions of said grooves and having optical reflectivity;
   (c) an optical recording layer on the surface of said transparent substrate, said layer covering a portion of said field of track grooves, not including said marginal zone, and said layer
      (i) having optical reflectivity,
      (ii) being recordable upon by a first energy beam of a recording wavelength,
      (iii) once recorded upon, being readable by a second energy beam of a read-out wavelength, and
      (iv) being susceptible to a change in its reflectivity if repeatedly irradiated at the same location by an unmoving source of said second energy beam; and
   (d) an opaque card substrate contiguous to said optical recording layer,
   wherein said marginal zone has substantially the same optical reflectivity as said optical recording layer but the optical reflectivity of said marginal zone is not subject to substantial change if repeatedly irradiated at the same location by an unmoving source of said second energy beam.

2. The optical card of claim 1, wherein said unrecordable part contains at least a phthalocyanine.

3. The optical card of claim 2, wherein said phthalocyanine is copper phthalocyanine.

4. The optical card of claim 1, wherein said unrecordable part comprises a compound shown below wherein R represents lower alkyl; X⊖ represents an anion; m represents 0, 1 or 2; and A represents (n is 1 or 2) or when m is 2.

5. The optical card of claim 1, wherein said marginal zone contains at least a compound represented by the formula shown below:

2Y⊖ wherein R is n—C₄H₉, and Y⊖ is ClO₄⊖.

6. The optical card of claim 1, wherein said unrecordable part comprises a film coated with an unrecordable material.

7. The optical card of claim 6, wherein said unrecordable material is a compound represented by the following

2Y⊖ wherein R is n—C₄H₉, and Y⊖ is ClO₅⊖.

8. The optical card of claim 6, wherein said unrecordable material is a phthalocyanine.

9. The optical card of claim 1, wherein said card comprises two such marginal zones, one containing the groove ends at one side of said field, the other containing the opposite ends of the grooves.

10. The optical card of any one of claims 1, 2, 4, 6, 7 or 8, wherein said opaque card substrate is adhered to said optical recording layer with an adhesive layer interposed between said opaque card substrate and said optical recording layer.

11. The optical card of claim 10, wherein said adhesive layer is a thermoplastic adhesive sheet.

12. The optical card of claim 11, wherein said thermoplastic adhesive sheet is 20 to 100 μm in thickness.

13. The optical card of claim 1, wherein said transparent substrate is provided thereon with a hard coat layer.

14. The optical card of claim 1, wherein said transparent substrate is provided thereon with an ultraviolet absorptive film.

15. The optical card of claim 1, wherein said optical recording layer comprises a compound shown below:

16. The optical card of claim 15, wherein said marginal zone contains at least a phthalocyanine.

17. The optical card of claim 16, wherein said marginal zone contains at least copper phthalocyanine.

18. The optical card of claim 15, wherein said marginal zone comprises a compound shown below:

wherein R represents a lower alkyl group; X⊖ represents an anion; m represents an integer of 0, 1 or 2; and A represents (n is 1 or 2) or when the above m is 2.

19. The optical card of claim 18, wherein said compound is

2Y⊖ wherein R is n—C₄H₉ and Y⊖ is ClO₄⊖.

20. The optical card of claim 18, wherein said compound is wherein R is n—$C_4H_9$, and $Y^\ominus$ is $ClO_4^\ominus$.

21. The optical card of claim 15, wherein said marginal zone comprises a film coated with wherein R is n—$C_4H_9$ and $Y^\ominus$ is $ClO_4^\ominus$.

22. A method for reading the optical card of claim 1 having information recorded therein, comprising the steps of (a) irradiating the transparent-substrate side of the card with said second energy beam while moving said second energy beam along said track grooves and (b) stopping said beam at the end of at least one said track groove in said marginal zone and then reversing its direction of travel.

23. The method of claim 22, wherein said opaque card substrate is adhered to said optical recording layer with an adhesive layer interposed between said opaque card substrate and said optical recording layer.

24. The method of any one of claims 22 or 23, wherein said transparent substrate is provided thereon with a hard coat layer.

25. The method of any one of claims 22 or 23, wherein said transparent substrate is provided thereon with an ultraviolet absorptive film.

* * * * *

UNITED STATES PATENT AND TRADEMARK OFFICE
CERTIFICATE OF CORRECTION

PATENT NO. : 5,248,584

DATED : September 28, 1993

INVENTOR(S) : MIURA ET AL.

It is certified that error appears in the above-identified patent and that said Letters Patent is hereby corrected as shown below:

Column 1

Line 22, "reflectivity" should read --reflectivity,--.
       Line 23, delete "with".

Column 2

Line 38, "when" should read --when it--.

Column 4

Line 51, "this" should read --thin--.
       Line 63, "polyetylene," should read --polyethylene,--.

Column 5

Line 23, delete "Te-Ch$_4$,Te-CS$_2$, Te-styrene, Sn-SO$_2$, GeS-".
       Line 24, delete "Sn, SnS-S with".
       Line 45, "enables" should read --enable--.
       Line 49, delete "with".
       Line 50, "i.e.," should read --(i.e.,--.
       Line 53, "reflectivity" should read --reflectivity,--.

Column 7

Line 20, "is" should read --are--.

Column 9

Line 47, "copolemer," should read --copolymer,--.

UNITED STATES PATENT AND TRADEMARK OFFICE
CERTIFICATE OF CORRECTION

PATENT NO. : 5,248,584
DATED : September 28, 1993
INVENTOR(S) : MIURA ET AL.

It is certified that error appears in the above-identified patent and that said Letters Patent is hereby corrected as shown below:

Column 10

Line 22, "preferably" should read --preferably be--.
Line 39, "certain" should read --a certain--.
Line 68, "this" should read --the--.

Column 12

Line 24, "this" should read --the--.

Column 13

Line 40, "cralate" should read --crylate--.
Line 44, "this" should read --the--.
Line 46, "used" should read --use--.

Column 14

Line 13, "this" should read --the--.
Line 19, "Toray INductries, Inc.)" should read --Toray Industries, Inc.)--.

Column 15

Line 8, "endesirable" should read --undesirable--.

Column 16

Line 31, "unrecord-" should read --marginal zone--.
Line 32, delete "able part".
Line 35, "unrecord-" should read --marginal zone--.
Line 36, delete "able part".

UNITED STATES PATENT AND TRADEMARK OFFICE
CERTIFICATE OF CORRECTION

PATENT NO. : 5,248,584

DATED : September 28, 1993

INVENTOR(S) : MIURA ET AL.

It is certified that error appears in the above-identified patent and that said Letters Patent is hereby corrected as shown below:

Column 17

Line 13, "$C1O_4^{\ominus}$." should read --$ClO_4^{\ominus}$.
Line 14, "unrecord-" should read --marginal zone--.
Line 15, delete "able part".
Line 33, "$C1O_5^{\ominus}$." should read --$ClO_4^{\ominus}$.--.

Column 18

Line 47, "$C1O_4^{\ominus}$." should read --$ClO_4^{\ominus}$.--.

Column 19

Line 23, "$C1O_4^{\ominus}$." should read --$ClO_4^{\ominus}$.--.

Column 20

Line 13, "$C1O_5^{\ominus}$." should read --$ClO_4^{\ominus}$.--.

Signed and Sealed this

Sixteenth Day of August, 1994

BRUCE LEHMAN

Attest:

Attesting Officer    Commissioner of Patents and Trademarks